United States Patent
Kim et al.

(10) Patent No.: US 11,375,391 B2
(45) Date of Patent: Jun. 28, 2022

(54) METHOD FOR REPORTING APERIODIC CSI IN WIRELESS COMMUNICATION SYSTEM AND DEVICE THEREFOR

(71) Applicant: LG Electronics Inc., Seoul (KR)

(72) Inventors: Hyungtae Kim, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/651,468

(22) PCT Filed: Oct. 1, 2018

(86) PCT No.: PCT/KR2018/011643
§ 371 (c)(1),
(2) Date: Mar. 27, 2020

(87) PCT Pub. No.: WO2019/066619
PCT Pub. Date: Apr. 4, 2019

(65) Prior Publication Data
US 2020/0267584 A1 Aug. 20, 2020

Related U.S. Application Data

(60) Provisional application No. 62/565,122, filed on Sep. 29, 2017.

(51) Int. Cl.
*H04W 24/10* (2009.01)
*H04B 17/336* (2015.01)
(Continued)

(52) U.S. Cl.
CPC .......... *H04W 24/10* (2013.01); *H04B 7/0413* (2013.01); *H04B 7/0626* (2013.01);
(Continued)

(58) Field of Classification Search
CPC .... H04W 24/10; H04W 76/27; H04B 17/336; H04B 7/0413; H04B 7/0626; H04B 7/0632; H04L 1/0026; H04L 5/0057
See application file for complete search history.

(56) References Cited

U.S. PATENT DOCUMENTS

2017/0164226 A1 6/2017 Wei et al.
2018/0063736 A1* 3/2018 Sadeghi ................ H04W 24/10

FOREIGN PATENT DOCUMENTS

KR 20150035555 4/2015
WO WO2016116669 7/2016

OTHER PUBLICATIONS

AT&T, "Aperiodic CSI Reporting for NR MIMO," R1-1702266, 3GPP TSG RAN WG1 Meeting #88, Athens, Greece, dated Feb. 13-17, 2017, 7 pages.
(Continued)

*Primary Examiner* — Janice N Tieu
(74) *Attorney, Agent, or Firm* — Fish & Richardson P.C.

(57) ABSTRACT

The present specification provides a method for reporting aperiodic channel state information (CSI) in a wireless communication system. Specifically, a method performed by the terminal comprises a step of receiving configuration information with respect to at least one reporting setting from a base station; a step of receiving control information indicating a measurement resource (MR) associated with the aperiodic CSI report from the base station; a step of computing aperiodic CSI on the basis of a particular reporting setting associated with the control information; and a step of transmitting the aperiodic CSI to the base station through a physical uplink control channel (PUCCH).

11 Claims, 7 Drawing Sheets

(51) Int. Cl.
   *H04B 7/06* (2006.01)
   *H04L 1/00* (2006.01)
   *H04W 76/27* (2018.01)
   *H04B 7/0413* (2017.01)
   *H04L 5/00* (2006.01)

(52) U.S. Cl.
   CPC ......... *H04B 7/0632* (2013.01); *H04B 17/336* (2015.01); *H04L 1/0026* (2013.01); *H04L 5/0057* (2013.01); *H04W 76/27* (2018.02)

(56) References Cited

OTHER PUBLICATIONS

Samsung, "Discussions on aperiodic CSI reporting for NR," R1-1702945, 3GPP TSG RAN WG1 Meeting #88, Athens, Greece, dated Feb. 13-17, 2017, 8 pages.

* cited by examiner

METHOD FOR REPORTING APERIODIC CSI IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/011643, filed on Oct. 1, 2018, which claims the benefit of U.S. Provisional Application No. 62/565,122 filed on Sep. 29, 2017, the contents of which are all hereby incorporated by reference herein in their entirety.

TECHNICAL FIELD

The disclosure relates to a wireless communication system, and more particularly, to a method for reporting aperiodic channel state information (CSI) and device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF THE INVENTION

Technical Problem

The disclosure aims to provide a method for reporting aperiodic CSI without a trigger by a CSI request based on information indicating a specific measurement resource.

The disclosure also aims to provide a method for performing measurement when information indicating a specific measurement resource and a CSI request are used together.

Objects of the present disclosure are not limited to the foregoing, and other unmentioned objects would be apparent to one of ordinary skill in the art from the following description.

Technical Solution

The present specification provides a method for reporting aperiodic channel state information (CSI) in a wireless communication system.

Specifically, a method performed by a user equipment comprises receiving configuration information for at least one reporting setting from a base station, receiving control information indicating a measurement resource (MR) related to the aperiodic CSI from the base station, the measurement resource including at least one of a channel measurement resource (CMR) or an interference measurement resource (IMR), computing the aperiodic CSI based on a specific reporting setting related to the control information, and transmitting the aperiodic CSI to the base station over a physical uplink control channel (PUCCH).

Further, in the disclosure, the CMR is a CSI-RS resource, and the IMR is a CSI-IM resource or interference CSI (ICSI)-RS resource.

Further, in the disclosure, the specific reporting setting is a reporting setting including all measurement resources indicated by the control information.

Further, in the disclosure, the reporting setting includes at least one of at least one CMR or at least one IMR.

Further, in the disclosure, the method further comprises receiving downlink control information including information for a CSI request from the base station.

Further, in the disclosure, a measurement resource included in a reporting setting indicated in the CSI request is received from the base station during a specific time.

Further, in the disclosure, the specific time is a sum of a first time before receiving the CSI request and a second time after receiving the CSI request.

Further, in the disclosure, information for the first time and information for the second time are received from the base station via RRC signaling.

Further, in the disclosure, the measurement resource is used for CSI acquisition.

Further, according to the disclosure, a UE reporting aperiodic channel state information (CSI) in a wireless communication system comprises a radio frequency (RF) module for transmitting/receiving a radio signal and a processor functionally connected with the RF module, wherein the processor is configured to: receive configuration information for at least one reporting setting from a base station; receive control information indicating a measurement resource (MR) related to the aperiodic CSI from the base station, the measurement resource including at least one of a channel measurement resource (CMR) or an interference measurement resource (IMR); compute the aperiodic CSI based on a specific reporting setting related to the control information; and transmit the aperiodic CSI to the base station over a physical uplink control channel (PUCCH).

Further, according to the disclosure, a method of receiving an aperiodic channel state information (CSI) report in a wireless communication system, performed by a base station, comprises transmitting configuration information for at least one reporting setting to a UE, transmitting control information indicating a measurement resource (MR) related to the aperiodic CSI to the UE, the measurement resource including at least one of a channel measurement resource (CMR) or an interference measurement resource (IMR), and receiving the aperiodic CSI from the UE over a physical uplink control channel (PUCCH).

Advantageous Effects

The disclosure may report CSI only with a measurement resource indication but with no separate CSI reporting trigger, thus reducing signaling overhead.

Further, the UE need not receive a CSI request from the base station, and this may eliminate the need for futile blind decoding on DCI with an unnecessary CSI request.

Effects of the present disclosure are not limited to the foregoing, and other unmentioned effects would be apparent to one of ordinary skill in the art from the following description.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein.

MODE FOR CARRYING OUT THE INVENTION

Figure 1:
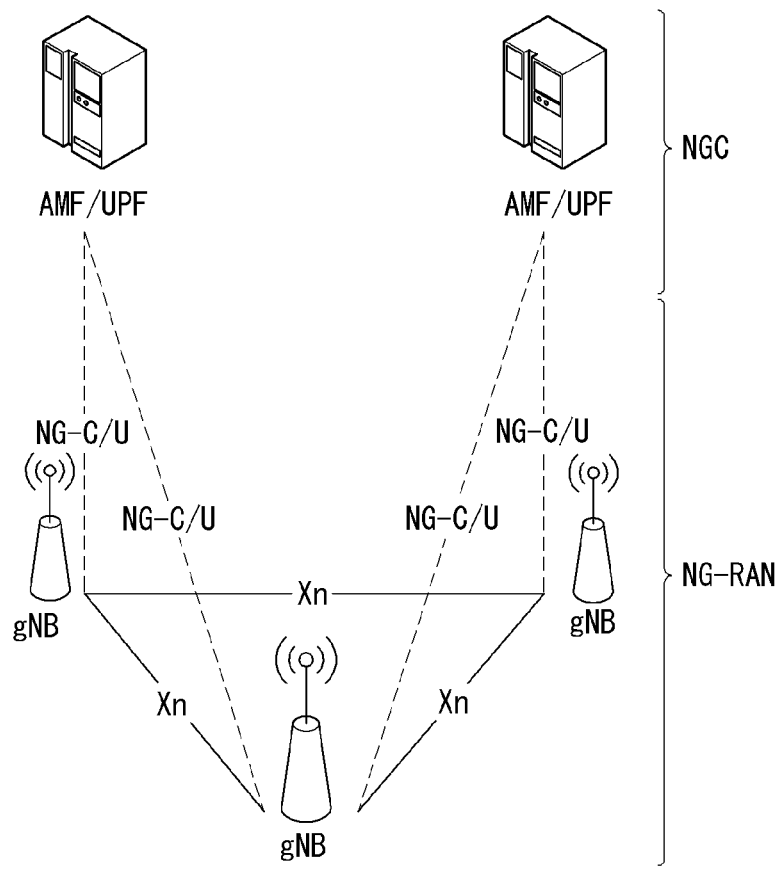
FIG. 1 is a view illustrating an example overall NR system structure to which a method as proposed in the disclosure may apply.

In what follows, preferred embodiments of the present disclosure will be described in detail with reference to appended drawings. Detailed descriptions to be disclosed below with reference to the appended drawings are intended to describe illustrative embodiments of the present disclosure but are not intended to represent the sole embodiment of the present disclosure. Detailed descriptions below include specific details to provide complete understanding of the present disclosure. However, it should be understood by those skilled in the art that the present disclosure may be embodied without the specific details to be introduced.

In some cases, to avoid obscuring the gist of the present disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The embodiments of the present disclosure may be supported by standard documents disclosed for at least one of wireless access systems such as the IEEE 802, 3GPP, and 3GPP2. In other words, those steps or portions among embodiments of the present disclosure not described to clearly illustrate the technical principles of the present disclosure may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present disclosure are not limited to the specific system.

Overview of Wireless Communication System

FIG. 1 illustrates a structure of a radio frame in a wireless communication system to which the disclosure may apply.

3GPP LTE/LTE-A supports radio frame structures of type 1 applicable to frequency division duplex (FDD) and radio frame structures of type 2 applicable to time division duplex (TDD).

In FIG. 1, the size of a radio frame in the time domain is represented as a multiple of the time unit of $T\_s=1/(15000*2048)$. Downlink and uplink transmission consists of a radio frame with a period $T\_f=307200*T\_s=10$ ms.

FIG. 1(a) illustrates an example structure of type 1 radio frame. The type 1 radio frame may apply to both full duplex and half duplex FDD.

The radio frame consists of 10 subframes. One radio frame consists of 20 slots with a length of T_slot=15360*T_s=0.5 ms, and the slots are indexed 0 through 19. One subframe consists of two consecutive slots in the time domain, and subframe i consists of slot 2i and slot 2i+1. The time taken to transmit one subframe is denoted a transmission time interval (TTI). For example, one subframe may be 1 ms long, and one slot may be 0.5 ms long.

In FDD, uplink transmission and downlink transmission are differentiated in the frequency domain. While full duplex FDD is not limited, half duplex FDD cannot allow the UE to simultaneously perform transmission and reception.

One slot includes a plurality of orthogonal frequency division multiplexing (OFDM) symbols in the time domain and includes a plurality of resource blocks (RBs) in the frequency domain. Since 3GPP LTE uses OFDMA in the downlink, OFDM symbol is intended for representing one symbol period. OFDM symbol may be referred to as an SC-FDMA symbol or symbol period. Resource block is the unit of resource allocation and, in one slot, includes a plurality of consecutive subcarriers.

FIG. 1(b) illustrates frame structure type 2.

A type 2 radio frame consists of two half frames each having a length of 153600*T_s=5 ms. Each half frame consists of five subframes with a length of 30720*T_s=1 ms.

In the type 2 frame structure of TDD system, uplink-downlink configuration is a rule indicating whether uplink and downlink are allocated (or reserved) for all the subframes.

Table 1 represents the uplink-downlink configuration.

TABLE 1

| Uplink-Downlink configuration | Downlink-to-Uplink Switch-point periodicity | \multicolumn{10}{c}{Subframe number} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of the radio frame, 'D' denotes the subframe for downlink transmission, 'U' denotes the subframe for uplink, and 'S' denotes the special subframe consisting of three fields, downlink pilot time slot (DwPTS), guard period (GP), and uplink pilot time slot (UpPTS).

The DwPTS is used for initial cell discovery, synchronization, or channel estimation in the UE. The UpPTS is used for channel estimation in the base station and uplink transmission synchronization of UE. The GP is a period for removing interference that occurs on the uplink due to multi-path delay of downlink signal between uplink and downlink.

Each subframe i consists of slot 2i and slot 2i+1 each having a length of T_slot=15360*T_s=0.5 ms.

There may be seven different uplink-downlink configurations, and each configuration differs in the position and/or number of downlink subframes, special subframes, or uplink subframes.

The time when downlink switches to uplink or uplink switches to downlink is denoted a switching point. Switch-point periodicity means the period during which switching between uplink subframe and downlink subframe is repeated in the same manner and, as supported, may be 5 ms or 10 ms. In the case of a downlink-uplink switch-point periodicity of 5 ms, the special subframe S exists in each half-frame and, in the case of a downlink-uplink switch-point periodicity of 5 ms, the special subframe S exists only in the first half-frame.

In all the configurations, subframe 0, subframe 5, and the DwPTS are periods only for downlink transmission. The UpPTS and the subframe very next to the subframe are periods always for uplink transmission.

Such a uplink-downlink configuration may be known, as system information, to both the base station and the UE. Whenever the uplink-downlink configuration information is varied, the base station may transmit only the indexes of the configuration information to notify the UE that the uplink-downlink allocation state of the radio frame has been altered. Further, like other scheduling information as a kind of downlink control information, the configuration information may be transmitted via the physical downlink control channel (PDCCH) or, as broadcast information, may be commonly transmitted to all the UEs in the cell via a broadcast channel.

Table 2 shows the configuration (DwPTS/GP/UpPTS) of the special subframe.

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | $6592 \cdot T_s$ | | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | | $20480 \cdot T_s$ | | |
| 2 | $21952 \cdot T_s$ | | | | $23040 \cdot T_s$ | | |
| 3 | $24144 \cdot T_s$ | | | | $25600 \cdot T_s$ | | |
| 4 | $26336 \cdot T_s$ | | | | $7680 \cdot T_s$ | $4384 \cdot T_s$ | $5120 \cdot T_s$ |
| 5 | $6592 \cdot T_s$ | | $4384 \cdot T_s$ | $5120 \cdot T_s$ | $20480 \cdot T_s$ | | |
| 6 | $19760 \cdot T_s$ | | | | $23040 \cdot T_s$ | | |
| 7 | $21952 \cdot T_s$ | | | | — | — | — |
| 8 | $24144 \cdot T_s$ | | | | — | — | — |

The radio frame architecture shown in FIG. 1 is merely an example. The number of subcarriers in the radio frame, the number of slots in the subframe, and the number of OFDM symbols in the slot may be varied.

Figure 2:
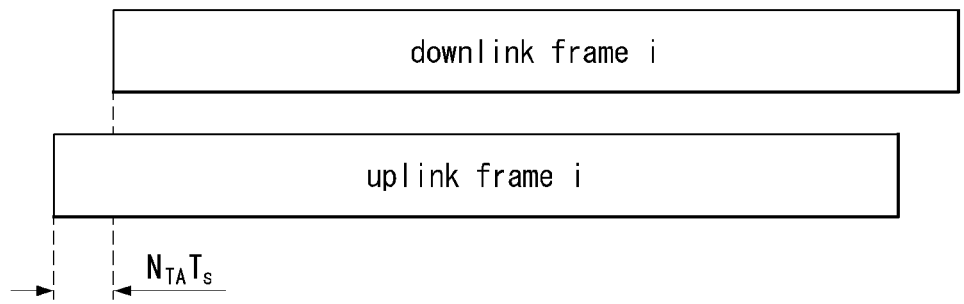
FIG. 2 illustrates the relationship between an uplink frame and downlink frame in a wireless communication system to which a method as proposed in the disclosure may apply.

FIG. 2 is a view illustrating an example resource grid for one downlink slot in a wireless communication system to which the disclosure may apply.

Referring to FIG. 2, one downlink slot includes a plurality of OFDM symbols in the time domain. Described herein is an example in which one downlink slot includes seven OFDM symbols, and one resource block includes 12 sub-carriers in the frequency domain. However, the disclosure is not limited thereto.

Each element in the resource grid is denoted a resource element, and one resource block (RB) includes 12×7 resource elements. The number, NADL, of resource blocks in the downlink slot depends upon the downlink transmission bandwidth.

The structure of uplink slot may be identical to the structure of downlink slot.

Figure 3:
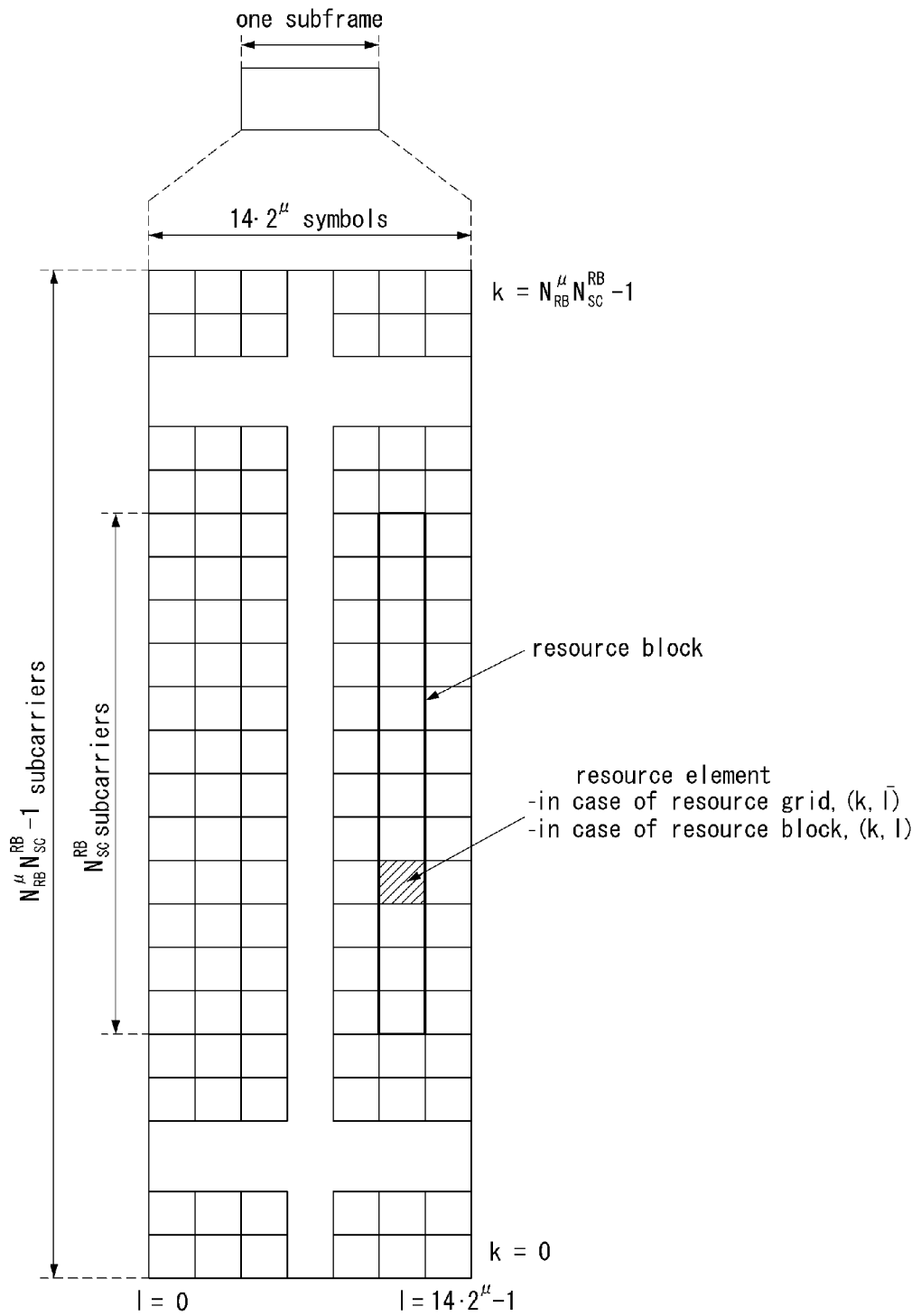
FIG. 3 illustrates an example resource grid supported in a wireless communication system to which a method as proposed in the disclosure may apply.

FIG. 3 illustrates a structure of a downlink subframe in a wireless communication system to which the disclosure may apply.

Referring to FIG. 3, up to three first OFDM symbols in the first slot in the subframe are a control region where control channels are allocated, and the other OFDM symbols are a data region where the physical downlink shared channel (PDSCH) is allocated. Example downlink control channels used in 3GPP LTE include Physical Control Format Indicator Channel (PCFICH), Physical Downlink Control Channel (PDCCH), and Physical Hybrid-ARQ Indicator Channel (PHICH).

The PCFICH is transmitted in the first OFDM symbols in the subframe and carries information regarding the number of OFDM symbols (i.e., the size of the control region) used for transmission of control channels in the subframe. The PHICH is a channel responsive to the uplink and carries an acknowledgement (ACK)/not-acknowledgement (NACK) signal for the hybrid automatic repeat request (HARQ). Control information transmitted via the PDCCH is denoted downlink control information (DCI). The downlink control information includes uplink resource allocation information, downlink resource allocation information, or uplink transmission (Tx) power control commands for any UE group.

The PDCCH may carry the resource allocation and transmission format (which is also referred to as a downlink grant) of downlink shared channel (DL-SCH), resource allocation information (which is also referred to as an uplink grant) for uplink shared channel (UL-SCH), paging information on paging channel (PCH), system information on DL-SCH, resource allocation for upper-layer control magnitude such as random access response transmitted on PDSCH, set of transmission power control commands for individual UE in any UE group, and activation of voice over IP (VoIP). A plurality of PDCCHs may be transmitted in the control region, and the UE may monitor the plurality of PDCCHs. The PDCCH is constituted of a set of one or more consecutive control channel elements (CCEs). The CCE is a logical allocation unit used to provide a coding rate according to the state of radio channel to the PDCCH. The CCE corresponds to a plurality of resource element groups. The format of PDCCH and the number of PDCCH bits available are determined depending on the association between the number of CCEs and the coding rate provided by the CCEs.

The base station determines the PDCCH format depending on the DCI to be transmitted to the UE and adds a cyclic redundancy check (CRC) to the control information. The CRC is masked with a unique identifier (this is referred to as a radio network temporary identifier (RNTI)) depending on the owner or purpose of the PDCCH. If the PDCCH is one for a specific UE, the CRC may be masked with a unique identifier, e.g., cell-RNTI (C-RNTI). Or, if the PDCCH is for a paging message, the CRC may be masked with a paging indication identifier, e.g., paging-RNTI (P-RNTI). If the PDCCH is for system information, more specifically, system information block (SIB), the CRC may be masked with a system information identifier or system information RNTI (SI-RNTI). To indicate a random access response which is a response to the UE's transmission of random access preamble, the CRC may be masked with a random access-RNTI (RA-RNTI).

The enhanced PDCCH (EPDCCH) carries UE-specific signaling. The EPDCCH is located in a UE-specifically configured physical resource block (PRB). In other words, although the PDCCH may be transmitted in up to first three OFDM symbols in the first slot in the subframe as set forth above, the EPDCCH may be transmitted in a resource region other than the PDCCH. The point (i.e., symbol) where the EPDCCH starts in the subframe may be configured in the UE via higher layer signaling (e.g., RRC signaling).

The EPDCCH may carry the transmission format related to DL-SCH, resource allocation and HARQ information, transmission format related to UL-SCH, resource allocation and HARQ information, and resource allocation information related to sidelink shared channel (SL-SCH) and physical sidelink control channel (PSCCH). Multiple EPDCCHs may be supported. The UE may monitor the EPCCH's set.

The EPDCCH may be transmitted by way of one or more consecutive enhanced CCEs (ECCEs), and the number of ECCEs per EPDCCH may be determined depending on each EPDCCH format.

Each ECCE may consist of a plurality of enhanced resource element groups (EREGs). The EREG is used to define mapping of ECCE to RE. There are 16 EREGs per PRB pair. Apart from the RE carrying the DMRS in each PRB pair, all the REs are numbered from 0 to 15 in ascending order of frequency and then in ascending order of time.

The UE may monitor the plurality of EPDCCHs. For example, one or two EPDCCH sets may be configured in one PRB pair in which the UE monitors EPDCCH transmission.

Different coding rates for EPCCH may be realized by merging different numbers of ECCEs. The EPCCH may use localized transmission or distributed transmission and, thus, mapping of ECCE to RE in PRB may be varied.

Figure 4:
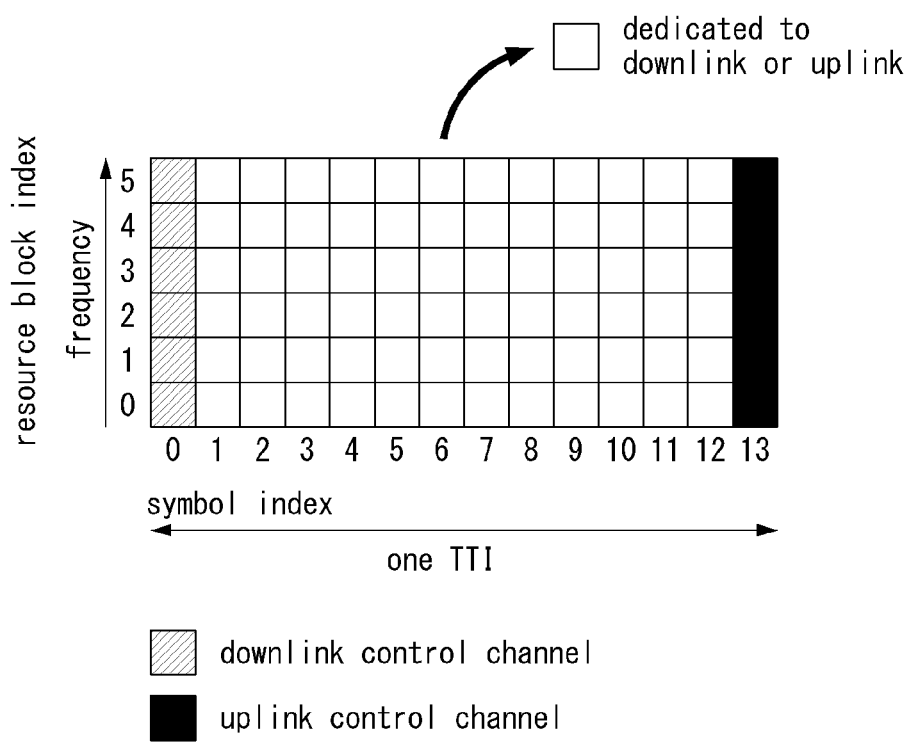
FIG. 4 illustrates an example self-contained subframe to which a method as proposed in the disclosure may apply.

FIG. 4 illustrates a structure of an uplink subframe in a wireless communication system to which the disclosure may apply.

Referring to FIG. 4, the uplink subframe may be divided into a control region and a data region in the frequency domain. The physical uplink control channel (PUCCH) carrying uplink control information is allocated in the control region. The physical uplink shared channel (PUSCH) carrying user data is allocated in the data region. To maintain the single carrier properties, one UE does not simultaneously transmit PUCCH and PUSCH.

The PUCCH for one UE is assigned a resource block (RB) pair in the subframe. The RBs in the RB pair occupy different subcarriers in each of the two slots. This is referred to as the RB pair allocated to the PUCCH frequency hopping at the slot boundary.

Downlink Channel State Information (CSI) Feedback

In current LTE standards, there are two transmission schemes: closed-loop MIMO and open-loop MIMO operated without channel information.

In closed-loop MIMO, the transmit/receive end performs beamforming based on control information, i.e., CSI, to obtain the multiplexing gain of MIMO antenna.

To obtain CSI, the base station allocates the physical uplink control channel (PUCCH) or physical uplink shared channel (PUSCH) to the UE, enabling it to feed back downlink CSI.

CSI is largely divided into three pieces of information, such as rank indicator (RI), precoding matrix index (PMI), and channel quality indication (CQI).

First, RI denotes rank information on channel and means the number of streams that the UE receives via the same frequency time resource.

This value is dominantly determined by long term fading of channel and is thus fed back from the UE to base station typically with a longer periodicity than the PMI or CQI.

The PMI is a value reflecting the spatial properties of channel and denotes the precoding index of the base station that the UE prefers with respect to the metric, e.g., SINR.

The CQI is a value indicating the strength of channel and means the reception SINR that may be obtained when the base station uses PMI.

In further advanced communication systems, such as LTE-A, obtaining additional multi-user diversity using multi-user MIMO (MU-MIMO) has been added.

To that end, higher accuracy is required in terms of channel feedback.

The reason is why, in MU-MIMO, feedback channel accuracy has a significant influence on interference with other multiplexed UEs as well as the UE having fed back due to the presence of interference between multiplexed UEs in the antenna domain.

It has been determined in LTE-A that the final PMI is designed to be divided into W1 which is the long term and/or wideband PMI and W2 which is the short term and/or sub-band PMI so as to raise feedback channel accuracy.

An example scheme of hierarchical codebook transformation that configures one final PMI from two pieces of channel information is to transform the codebook using the long-term covariance matrix of channel as follows.

Equation 1

$$W = \text{norm}(W1\,W2) \quad (1)$$

In Equation 1 above, W2(=short term PMI) is the codeword of codebook created to reflect short-term channel information, W the codeword of the final codebook transformed, and norm(A) the matrix in which the norm per column in matrix A has been normalized to 1.

The specific structures of legacy W1 and W2 are as follows.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{Equation 2}$$

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix} \text{ (if rank = } r\text{),}$$

where $1 \le k, l, m \le M$ and $k, l, m$ are integer.

The codeword structure has been designed to reflect the correlation characteristics of channel that occur when cross polarized antennas are used and the antennas are dense (typically when the distance between adjacent antennas is not more than a half of the signal wavelength).

The cross polarized antennas are divided into a horizontal antenna group and a vertical antenna group. Each antenna group has the characteristics of the uniform linear array (ULA) antenna, and the two antenna groups are co-located.

Thus, the inter-antenna correlation in each group has the characteristic of the same linear phase increment, and the inter-antenna group correlation has the characteristic of phase rotation.

Since the codebook is a value resulting from quantizing channel, it is needed to design the codebook by applying the characteristics of channel corresponding to the source as they are. For ease of description, from an example of a rank 1 codeword created in the above structure, it may be identified that such channel traits have been applied to the codeword meeting Equation 2.

$$W1(i) * W2(j) = \begin{bmatrix} X_i(k) \\ \alpha_j X_i(k) \end{bmatrix} \quad \text{Equation 3}$$

In Equation 3 above, the codeword is represented with vectors of Nt (number of Tx antennas) by 1, is structured with two vectors: higher vector $X_i(k)$ and lower vector $\alpha_i X_i(k)$, and each shows the correlation characteristics of horizontal antenna group and vertical antenna group.

$X_i(k)$ is advantageously represented as a vector with linear phase increment, with the inter-antenna correlation in each antenna group applied, and as a representative example, the DFT matrix may be used.

Further, a higher channel accuracy is needed for CoMP.

Since several base stations cooperatively transmit the same data to a specific UE in the case of CoMP JT, it may be theoretically regarded as a MIMO system in which antennas are geographically distributed.

In other words, even in the case where MU-MIMO is performed in JT, a high level of channel accuracy is required to avoid interference between the UEs co-scheduled like single cell MU-MIMO.

Further, accurate channel information is required to avoid interference of the neighbor cell with the serving cell also in the case of CoMP CB.

Restricted RLM and RRM/CSI Measurement

As a method of interference coordination, a silent subframe (almost blank subframe, also referred to as ABS) in which the aggressor cell reduces the transmission power/activity of some physical channel (including the operation of setting to zero power) may be used, and time domain inter-cell interference coordination is possible that the victim cell schedules the UE considering the same.

In this case, in the position of the victim cell UE, the interference level may significantly vary depending on subframes.

At this time, in order to measure channel state information (CSI) for performing link adaptation or radio resource management (RRM) that measures, e.g., more accurate radio link monitoring (RLM) or RSRP/RSRQ in each subframe, the monitoring/measurement needs to be limited to subframe sets with uniform interference characteristics.

In 3GPP LTE system, restricted RLM and RRM/CSI measurement has been defined as follows.

UE Procedure for Reporting Channel State Information (CSI)

To report CSI constituted of CQI, PMI, and/or RI controlled by the eNB, time and frequency resources may be used by the UE.

For spatial multiplexing, the UE needs to determine the RI corresponding to the number of transmission layers.

At this time, for transmission diversity, RI is 1.

If the UE is set to transmission mode 8 or 9, PMI/RI reporting may be performed or not by the higher layer parameter pmi-RI-Report.

If the subframes are configured as $c_{CSI,0}$ and $C_{CSI,1}$ in the higher layer, the UE may be configured with resource-restricted CSI measurements.

At this time, CSI reporting may be periodic or aperiodic.

If the UE is configured with one or more serving cells, CSI may be transmitted only in the activated serving cell.

Unless the UE is configured for simultaneous transmission of PUSCH and PUCCH, the UE needs to periodically report CSI for PUCCH in subframes with no PUSCH allocated as described below.

If the UE is not configured for simultaneous transmission of PUSCH and PUCCH, the UE needs to report periodic CSI for PUSCH of serving cell with the minimum servcellindex in the PUSCH-allocated subframe.

At this time, the UE needs to start periodic CSI reporting format based on the same PUCCH for PUSCH.

Thereafter, if specified specific conditions are met, the UE is required to perform aperiodic CSI reporting via PUSCH.

Aperiodic CQI/PMI reporting and RI reporting are transmitted only when the CSI feedback type supports RI reporting.

The set of UE subbands may evaluate CQI reporting corresponding to the whole downlink system bandwidth.

Subband is a set of k PRBs, where k is the function of system bandwidth.

In the last subband in S set, the number of consecutive PRBs may be smaller than k depending on $N_{RB}^{DL}$.

The number of system bandwidths given by $N_{RB}^{DL}$ may be defined as $N=\lceil N_{RB}^{DL}/k \rceil$.

The subbands need to be indexed in ascending order of frequency from the minimum frequency and in an order in which size does not increase.

Table 3 shows the configuration of subband size k and system bandwidth.

TABLE 3

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

Aperiodic Multiple IMR Configuration Method for Advanced Interference Measurement In the disclosure, there are described a method of configuring and using a plurality of different interference measurement resources (IMRs) in one CSI process so as to efficiently measure interference for MIMO/multi-user operation between the base station/UE with multiple antennas as in the FD-MIMO environment and new RAT and signaling and its operations when the IMR is used in the on-demand scheme.

There are also proposed report signaling and its operations upon calculating and reporting CSI considering interference measured using the IMR.

For eFD-MIMO, up to 64 transmit ports may be considered instead of up to eight transmit antenna ports in legacy LTE-A and may be maintained or further increased as evolving to NR-MIMO.

In this case, since overhead increases due to an increase in REs allocated for CSIRS to measure CSI, a need exists for a method for reducing the overhead.

To that end, aperiodic CSIRS is considered that transmits CSIRS only when needed, rather than periodically, to allow the UE to compute the CSI.

Thus, aperiodic IMR to be used for aperiodic CSIRS is needed.

Further, in new RAT, the performance of MU-MIMO is being considered as more critical so as to support UEs that are to soar.

Thus, it comes to significance to measure influence by interference of UEs with each other for MU. In particular, a need arises for brand new interference measurement for interference between the UEs using different analog beams.

To measure several interferences, there is increased need for configuring more IMRs than in legacy LTE.

However, new RAT is aiming at reducing always-on signaling as much as possible.

Further, it is preferable to use aperiodic IMR in an on-demand scheme (i.e., measuring IMR only when the base station indeed intends to measure interference) instead of legacy periodic IMR so as to reduce overhead of CSI-IM.

Hence, the disclosure proposes a scheme of configuring multiple CSI-IMs for aperiodic CSI-IM and signaling and its operations for using the CSI-IM.

There are also proposed report signaling and its operations upon calculating and reporting CSI considering interference measured from the CSI-IM.

The terms for base station as described in the disclosure may be applied to transmission/reception points, such as cells, base stations, eNBs, sectors, transmission points (TPs), reception points (RPs), remote radio heads (RRHs), or relays.

Further, the term 'base station' is collectively used to distinguish component carriers in a specific transmission/reception point.

In particular, for ease of description in the disclosure, as a term for base station, the point which performs DL/UL transmission to the UE is referred to as transmission and reception point (TRP).

The TRP may correspond to a specific physical cell, a plurality of physical cell groups, a specific analog beam, or a specific analog beam group.

Further, antenna port hereinafter means a virtual antenna element for which the same channel characteristic (e.g., delay profile or Doppler spread) may be assumed (in at least the same resource block).

Subframe (SF) below means the unit of transmission which is repeated in a predetermined length, and SF may have different definitions per numerology.

Although the terms "CSI-RS" and "CSI-IM" are used in the disclosure for ease of description, they may also be denoted RS for CSI measurement and RS for interference measurement, respectively, as used in NR-MIMO.

The proposed schemes are described below based on the 3GPP LTE system for ease of description.

However, the scope of systems to which the proposed schemes are applied may be expanded to other systems (e.g., UTRA) than the 3GPP LTE system.

The configuration of CSI-IM currently defined in LTE 36.331 is as follows:

TABLE 4

```
ASN1START
CSI-IM-Config-r11 ::=          SEQUENCE {
csi-IM-ConfigId-r11              CSI-IM-ConfigId-r11,
resourceConfig-r11               INTEGER (0..31),
subframeConfig-r11               INTEGER (0..154),
...,
[[ interferenceMeasRestriction-r13  BOOLEAN OPTIONAL --Need ON
]]
}
CSI-IM-ConfigExt-r12 ::=       SEQUENCE {
csi-IM-ConfigId-v1250            CSI-IM-ConfigId-v1250,
resourceConfig-r12               INTEGER (0..31),
subframeConfig-r12               INTEGER (0..154),
...,
[[ interferenceMeasRestriction-r13 BOOLEAN  OPTIONAL, --Need ON
csi-IM-ConfigId-v1310 CSI-IM-ConfigId-v1310 OPTIONAL --Need ON
]]
}
-- ASN1STOP
```

That is, csi-IM-Config includes csi-IM-ConfigId, resourceConfig indicating the RE pattern of IMR in RB, and subframeConfig indicating the offset and transmission period.

In particular, as the RE pattern, one is selected from among the 4-port CSIRS patterns.

One csi-IM-ConfigID is defined in the CSI process, and the CSI process includes one CSI-IM.

Aperiodic CSI-IM may be divided into one-shot CSI-IM and semi-persistence CSI-IM.

Further, One-shot CSI-IM is a scheme to indicate CSI-IM measurement of one time (i.e., 1 subframe) via the CSI-IM measure indication transmitted to the UE.

Further, semi-persistence CSI-IM is an aperiodic CSI-IM of the type in which the measure of CSI-IM is periodically indicated to the UE during a predetermined time period via L1/L2 signaling of type such as enable/disable.

The configuration of the semi-persistence CSI-IM may have a similar configuration to the csi-IM-Config.

In this case, however, only period is configured, and offset is not.

To jointly use one resource for both aperiodic and semi-persistence sides, it is required that a period be configured per CSI-IM or a period to be used in all the CSI-IMs be configured.

The configuration of aperiodic CSI-IM, particularly one-shot CSI-IM, features that no transmission period and offset are defined and, in the case of different aperiodic CSI-IMs (one-shot CSI-IMs), measurement results are not averaged (i.e., MR on).

For example, in the case of FD-MIMO, among the parameters, the subframeConfig is not configured, and the base station notifies the UE whether the CSI-IM is measured and, if so, which CSI-IM needs to be measured via signaling to be described below.

Further, even in NR-MIMO, no configuration for transmission period and offset may be given in aperiodic CSI-IM (one-shot CSI-IM) configuration in a similar manner.

In the disclosure, ICSI-RS is described in addition to the legacy CSI-IM.

The legacy CSI-IM is an IMR that measures the power of interference and reports the same (e.g., reporting CQI based on interference or directly reporting the interference) like the LTE's CSI-RS-based IMR.

Further, the ICSI-RS is the IMR adopting a scheme that measures the interference channel using a sequence designated for the resource, as the NZP CSI-RS, and performs its related interference reporting (e.g., reporting the eigenvector of interference channel).

That is, the ICSI-RS may include a sequence-related configuration, such as sequence initialization factor, in the CSI-IM.

More specifically, the ZP CSI-RS based IMR used in legacy LTE corresponds to the CSI-IM scheme and, if the NZP CSI-RS based IMR described below is used, it may be used for both the schemes.

Unless described separately, aperiodic CSI-IM collectively denotes one-shot CSI-IM and semi-persistence CSI-IM. Further, CSI-IM collectively denotes CSI-IM for interference power measurement and ICSI-RS for measurement of interference channel.

In practice, unless separate information is needed for sequence detection of NZP RS (e.g., common initialize factor with same cell ID), a configuration with no differentiation between the two corresponding resources may be used in terms of configuration.

A method of reporting CSI via indication of a specific measurement resource included in the (CSI) reporting setting proposed in the disclosure is described below in detail.

The definition of measurement resource is described below.

The new radio (NR) system considers a method of performing aperiodic CSI reporting using PUCCH, not PUSCH.

As such, if aperiodic CSI reporting is performed via a resource that need not separate scheduling (i.e., via PUCCH), aperiodic CSI reporting may be implicitly signaled to the UE without separate aperiodic CSI reporting trigger (i.e., without CSI request transmission) but only with a specific measurement resource described in the disclosure.

Here, indication of specific measurement resource may mean joint signaling for at least one of aperiodic NZP CSI-RS, CSI-IM, or ICSI-RS.

Also proposed in the disclosure is a method of triggering a specific reporting setting among a plurality of reporting settings configured in the UE.

For ease of description, 'joint signaling for at least one of aperiodic NZP CSI-RS, CSI-IM, or ICSI-RS indication' is replaced below with 'RS indication' or 'control information.'

In other words, RS indication or control information may mean information indicating at least one measurement resource included in a specific reporting setting.

Here, aperiodic NZP CSI-RS, CSI-IM, or ICSI-RS may be expressed as measurement resource.

More specifically, the measurement resource includes at least one of resource (CMR) for channel measurement or resource (IMR) for interference measurement, and the CSI reporting setting includes at least one of CMR or IMR.

Further, although the proposed schemes are described based on the 3GPP new RAT system for ease of description, the scope of systems to which the proposed schemes are applied may be expanded to other systems (e.g., LTE or UTRA) than the 3GPP new RAT system.

Measurement resource (NZP CSI-RS, CSI-IM, or ICSI-RS) may mean RSs used for the purpose of CSI acquisition, not for beam management.

The base station may differentiate between RSs for beam management (BM) and RSs for CSI acquisition, not for BM, (per CSI-RS resource set) and notify the UE of them.

Thereafter, if the RS used for CSI acquisition is configured as in the following reporting setting, the UE computes CSI for all or some of the plurality of CSI reporting settings by applying the methods described below and reports the computed CSI to the base station.

At this time, the base station may configure a reporting setting in the UE, and the configuration may include components 1 to 3 as follows.

Reporting Setting Index

Kinds of CSI Parameters to be Reported in Each Reporting Setting e.g., CRI (CSI resource indicator), RI (rank indicator), PMI (precoding matrix indicator), CQI (channel quality indicator)

RS to be Measured and Used in Each Reporting Setting e.g., CMR (channel measurement resource), IMR (interference measurement resource)

Table 5 shows an example configuration for reporting settings.

TABLE 5

| Reporting setting index | Measure RS | Reporting parameters |
| --- | --- | --- |
| 0 | CMR 0, IMR 0 | RI, PMI, CQI |
| 1 | CMR 1, IMR 0 | RI, PMI, CQI |
| 2 | CMR 0, IMR 1 | RI, PMI, CQI |
| 3 | (CMR 2, IMR 0), (CMR 3, IMR0) | CRI |

In Table 5 above, CMR x and IMR y mean calculating CSI measured on the IMR with the CMR and index y with index x among a plurality of CMRs and IMRs, respectively, and reporting the computed CSI.

At this time, if the UE receives an indication for a specific resource group at a certain time, the UE may compute and report CSI by referring to the above-described reporting setting configuration.

Described below are various methods of determining the reporting setting to compute and report CSI.

(Method 1)

Method 1 is a method of determining a reporting setting in which at least one of channel measurement RSs (e.g., CSI-RS) has been RS-indicated, and at least one of interference measurement RSs (e.g., CSI-IM) has been RS-indicated and calculating and reporting CSI for the reporting setting.

For example, it is assumed that such a reporting setting as shown in Table 5 has been configured in the UE, and CMR 0, CMR 1, and IMR 0 have been indicated in the RS indication.

At this time, the UE regards the CSI corresponding to reporting setting 0 or 1 as triggered, computes aperiodic CSI therefor, and reports the CSI to the base station.

Method 1 may guarantee measurement of at least one of CMR and IMR for CSI reporting, advantageously ensuring that the UE performs calculation and reporting of CSI.

Further, the base station may dynamically configure its desired interference hypothesis in the UE in such a manner as to transmit only IMR of some of the plurality of IMRs.

(Method 2)

Method 2 is a method of calculating CSI for a reporting setting in which all RSs designated in the reporting setting are included in the RS indication and reporting the CSI to the base station.

If the received RS indication includes all of the RSs designated in a specific reporting setting, the UE computes/reports the CSI corresponding to the reporting setting.

For example, it is assumed that such a reporting setting as shown in Table 5 has been configured in the UE, and CMR 0, CMR 1, and IMR 0 have been indicated in the RS indication.

At this time, the UE regards the CSI corresponding to reporting setting 0 or 1 as triggered, computes aperiodic CSI therefor, and reports the CSI.

Further, even when triggering CSI reporting needing a plurality of CMRs as in the CRI reporting case corresponding to reporting setting 3 in Table 5 above, all of the CMRs/IMRs need to be included in the RS indication.

Although similar to the operation of notifying of a specific report setting by the base station, method 2 provides an advantage in that there is no need for configuring a separate CSI trigger.

Further, the UE may expect (or assume) that all of the RSs for a specific reporting setting intended by the base station are transmitted in the slot (or subframe).

(Method 3)

Method 3 is a method of triggering all reporting settings including any one of the RSs indicated by the RS indication.

In other words, the UE may compute and report CSI for all the reporting settings including the RS indicated by the received RS indication.

For example, it is assumed that such a reporting setting as shown in Table 5 has been configured in the UE, and CMR 0, CMR 1, and IMR 0 have been indicated in the RS indication.

At this time, the UE regards the CSI corresponding to reporting setting 0, 1, 2, or 3 as triggered, computes aperiodic CSI therefor, and reports the CSI.

Method 3 is a method for updating and reporting only measurement on a specific RS when a plurality of RSs are measured and CSI is computed and reported.

In particular, method 3 reuses the latest or averaged measurement result among measurement results for the other RS(s) than the RS designated in the RS indication. Method 3 may reduce transmission of RSs expected to make no significant change, resultantly decreasing RS overhead.

Method 3 requires that there be transmission of RS not included in the same RS indication before the RS indication and that there be transmission and measurement of the RS not long ago, i.e., in a time period from the time which is a specific time period T_expire_start earlier than the time of RS indication to the time of RS indication.

Similarly, as in the CRI reporting case corresponding to reporting setting 3 of Table 5, even upon attempting to trigger CSI reporting needing a plurality of CMRs, non-indicated CMRs should have been transmitted one or more times within the above-described T_expire_start period.

Or, for MRs not included in the RS indication among the IMRs/CMRs used for specific CSI calculation, the UE computes CSI based on the latest MR received.

Meanwhile, if the remaining RSs have not been transmitted before the RS indication, the UE may wait for transmission of the remaining RSs for a predetermined time period T_expire_end.

This is why the UE may need to identify transmission of the remaining RSs.

That is, the UE may compute and report the CSI to the base station at the time of identifying and measuring transmission of all the RSs designated in the specific report setting.

Here, T_expire_end may be configured in the UE by higher layer signaling such as RRC configuration.

If the UE fails to receive the remaining RSs during the T_expire_end, the UE may refrain from reporting the CSI corresponding to the reporting setting or may report the CSI without update.

(Method 4)

Method 4 is a method of calculating CSI for a reporting setting in which CMR RSs designated in the reporting setting are included in the RS indication and reporting the CSI.

The UE may compute and report CSI for all the reporting settings including CMR among the RSs indicated by the received RS indication.

For example, it is assumed that such a reporting setting as shown in Table 5 has been configured in the UE, and CMR 0, CMR 1, and IMR 0 have been indicated in the RS indication.

At this time, the UE regards the CSI corresponding to reporting setting 0, 1, or 2 as triggered, computes the aperiodic CSI, and reports the CSI.

As another example, it is assumed that CMR 0, IMR 0, and IMR 1 have been indicated in the RS indication.

At this time, the UE regards the CSI corresponding to reporting setting 0 or 2 as triggered, computes the aperiodic CSI, and reports the CSI.

Although similar to method 2, method 4 supports only updating, particularly, CMR.

Thus, method 4 requires that there be transmission of IMR not included in the same RS indication before the RS indication and that there be transmission and measurement of the IMR not long ago, i.e., in a time period from the time which is a specific time period T_expire_start earlier than the time of RS indication to the time of RS indication.

Or, for MRs not included in the RS indication among the IMRs/CMRs used for specific CSI calculation, the UE computes CSI based on the latest MR received.

Meanwhile, there may the case where there is no transmission of the remaining CMRs before the RS indication.

At this time, the UE may wait for transmission of the remaining CMRs for a predetermined time period T_expire_end.

If the UE identifies transmission of the remaining CMRs, i.e., at the time of identifying and measuring transmission of all the CMRs designated in the specific report setting, the UE may compute and report the CSI.

T_expire_end may be configured in the UE by higher layer signaling such as RRC configuration.

Meanwhile, if the UE fails to receive the remaining CMRs during the T_expire_end, the UE may refrain from reporting the CSI corresponding to the reporting setting or may report the CSI without update.

(Method 5)

Method 5 is a method of calculating CSI for a reporting setting in which IMRs designated in the reporting setting are included in the RS indication and reporting the CSI.

The UE may compute and report CSI for all the reporting settings including IMR among the RSs indicated by the received RS indication.

For example, it is assumed that such a reporting setting as shown in Table 5 has been configured in the UE, and CMR 0, CMR 1, and IMR 0 have been included and indicated in the RS indication.

At this time, the UE regards the CSI corresponding to reporting setting 0, 1, or 3 as triggered, computes aperiodic CSI therefor, and reports the CSI.

As another example, if CMR 0, IMR 0, and IMR 1 have been included and indicated in the RS indication, the UE regards the CSI corresponding to reporting setting 1 or 3, as well as reporting setting 0 or 2, as triggered and computes and reports the aperiodic CSI.

Although similar to method 2, method 5 supports only updating, particularly, IMR.

Thus, method 5 requires that there be transmission of CMR not included in the same RS indication before the RS indication and that there be transmission and measurement of the CMR not long ago, i.e., in a time period from the time which is a specific time period T_expire_start earlier than the time of RS indication to the time of RS indication.

Or, for MRs not included in the RS indication among the IMRs/CMRs used for specific CSI calculation, the UE computes CSI based on the latest MR received.

Meanwhile, there may the case where there is no transmission of the remaining IMRs before the RS indication.

At this time, the UE may wait for transmission of the remaining IMRs for a predetermined time period T_expire_end.

If the UE identifies transmission of the remaining IMRs, i.e., at the time of identifying and measuring transmission of all the IMRs designated in the specific report setting, the UE may compute and report the CSI.

T_expire_end may be configured in the UE by higher layer signaling such as RRC configuration.

Meanwhile, if the UE fails to receive the remaining IMRs during the T_expire_end, the UE may refrain from reporting the CSI corresponding to the reporting setting or may report the CSI without update.

If the above-described scheme is used, the CSI timing is determined based on the last RS timing transmitted/measured.

The T_expire_start and/or T_expire_end set in methods 2 to 4 described above may be configured in the UE by the base station via higher layer signaling such as RRC.

Additionally, in each method, the T_expire_start and/or T_expire_end may be independently configured for each of CMR and IMR.

Further described is a method of reporting CSI when the above-described RS indication is used together as separate signaling form the CSI request.

Here, the RS indication may use a different field of the same DCI as the CSI request or use separate DCI.

All of the RSs included in the specific reporting setting designated in the CSI request need to be transmitted within the above-described T_expire.

Figure 5:
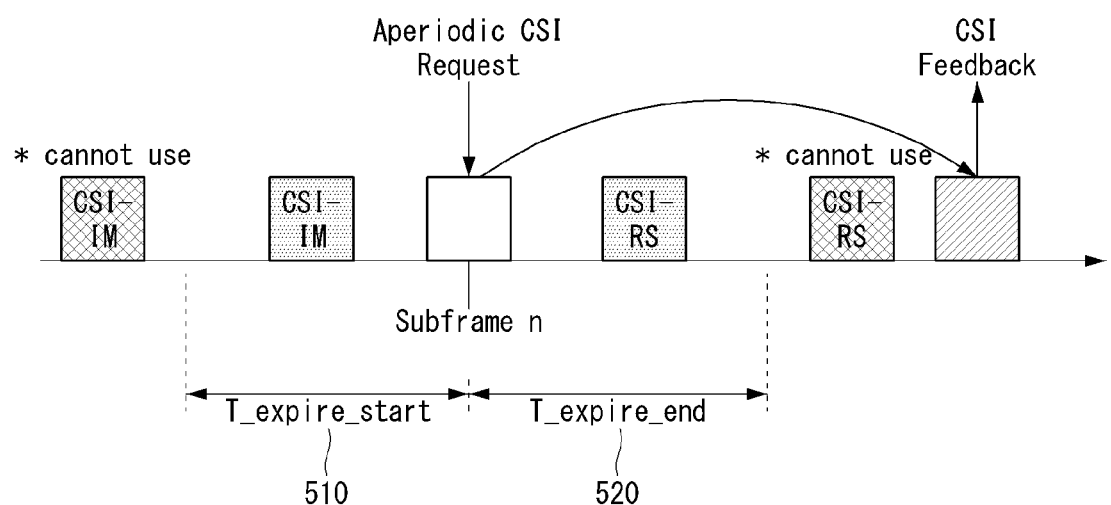
FIG. 5 is a view illustrating example RSs available for reporting CSI during a predetermined time as proposed in the disclosure.

The T_expire may be defined so that all of the RSs should be transmitted within the time period of T_expire_start+T_expire_end=T_expire between the time which is T_expire_start (510) earlier than the time of reception of the CSI request by the UE to the time which is T_expire_end (520) later than the time of reception of the CSI request, as shown in FIG. 5.

If all of the RSs designated in the CSI request are not received within the time period, the UE may refrain from CSI reporting corresponding to the CSI request or may transmit the CSI previously reported without update.

By setting T_expire_start=T_expire_end, a further simplified period configuration may be considered.

Further, T_expire_start and T_expire_end may be configured in the UE via higher layer signaling such as RRC configuration.

At this time, a predetermined time period between the CSI feedback timing and the T_expire_end needs to be ensured and, for this, the above-described CSI feedback timing may be used.

FIG. 5 is a view illustrating example RSs available for reporting CSI during a predetermined time as proposed in the disclosure.

Since the above-described methods need not UL resource allocation, the CMR/IMR indication may be transmitted via DL DCI.

For similar purposes, CSI reporting may be performed via (short or long) PUCCH when (explicitly or implicitly) aperiodic CSI triggered with DL DCI and via PUSCH when (explicitly or implicitly) aperiodic CSI triggered with UL DCI.

Method of Operation by UE

Figure 6:
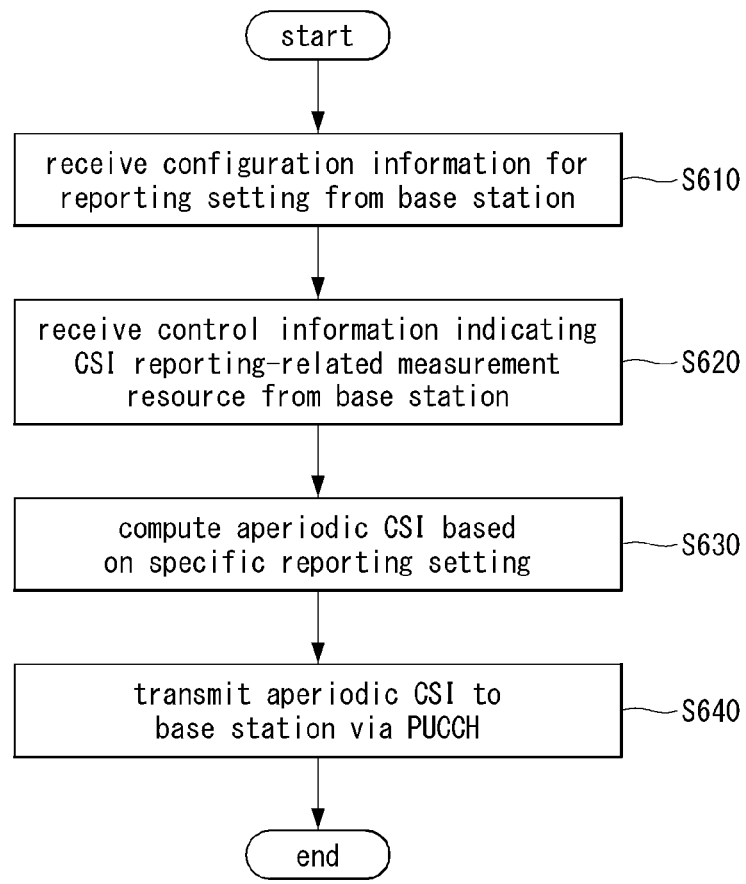
FIG. 6 is a view illustrating an example method of operation by a UE performing a method as proposed in the disclosure.

FIG. 6 is a view illustrating an example method of operation by a UE performing a method as proposed in the disclosure.

More specifically, FIG. 6 illustrates a method of operation by the UE to report aperiodic channel state information (CSI) in a wireless communication system.

The UE receives configuration information for at least one (CSI) reporting setting from the base station (S610).

Here, the reporting setting may include at least one among at least one CMR or at least one IMR.

As set forth above, a resource including at least one of the at least one CMR or the at least one IMR may be represented as a measurement resource.

The UE receives control information indicating the measurement resource (MR) related to aperiodic CSI reporting from the base station (S620).

Here, the measurement resource may include at least one of a channel measurement resource (CMR) or interference measurement resource (IMR).

The UE computes aperiodic CSI based on a specific reporting setting related to the control information (S630).

The specific reporting setting may be a reporting setting including all of the measurement resources indicated by the control information.

The UE transmits the aperiodic CSI to the base station over the physical uplink control channel (PUCCH) (S640).

Here, the CMR may be a CSI-RS resource, and the IMR may be a CSI-IM resource or interference CSI (ICSI)-RS resource.

Additionally, the UE may receive downlink control information including information for the CSI request from the base station.

In this case, the measurement resource included in the reporting setting indicated in the CSI request is received from the base station during a specific period.

The specific time may be represented as the sum of a first time before receiving the CSI request and a second time after receiving the CSI request.

Information for the first time and information for the second time may be received from the base station via RRC signaling.

The measurement resource may be used for CSI acquisition.

In other words, by the method of FIG. 6, the UE need not receive a CSI request from the base station, and this may eliminate the need for futile blind decoding on DCI with an unnecessary CSI request.

Method of Operation by Base Station

Figure 7:
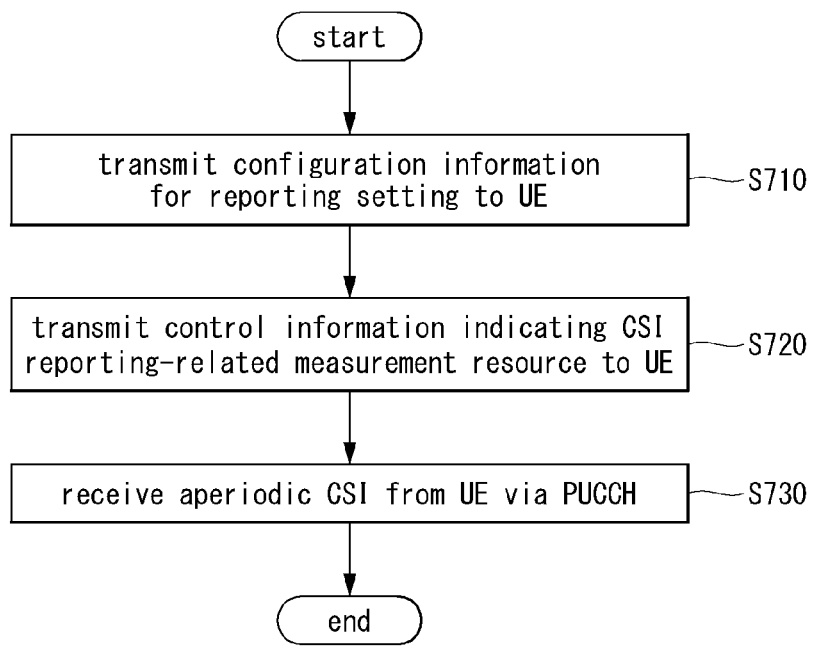
FIG. 7 is a view illustrating an example method of operation by a base station performing a method as proposed in the disclosure.

FIG. 7 is a view illustrating an example method of operation by a base station performing a method as proposed in the disclosure.

More specifically, FIG. 7 illustrates a method of operation by the base station to receive aperiodic channel state information (CSI) report in a wireless communication system.

First, the base station transmits configuration information for at least one reporting setting to the UE (S710).

The base station transmits control information indicating the measurement resource (MR) related to aperiodic CSI report to the UE (S720).

The measurement resource may include at least one of a channel measurement resource (CMR) or interference measurement resource (IMR).

The base station receives the aperiodic CSI report from the UE over the physical uplink control channel (PUCCH) (S730).

The CMR may be a CSI-RS resource, and the IMR may be a CSI-IM resource or interference CSI (ICSI)-RS resource.

The specific reporting setting may be a reporting setting including all of the measurement resources indicated by the control information.

The reporting setting may include at least one among at least one CMR or at least one IMR.

Additionally, the base station may transmit downlink control information including information for the CSI request to the UE.

In this case, the measurement resource included in the reporting setting indicated in the CSI request may be transmitted to the UE during a specific time.

In other words, by the method of FIG. 7, the base station need not transmit a CSI request to the UE, and this provides the effect of reducing signaling overhead.

Devices to which the Present Disclosure May Apply

Figure 8:
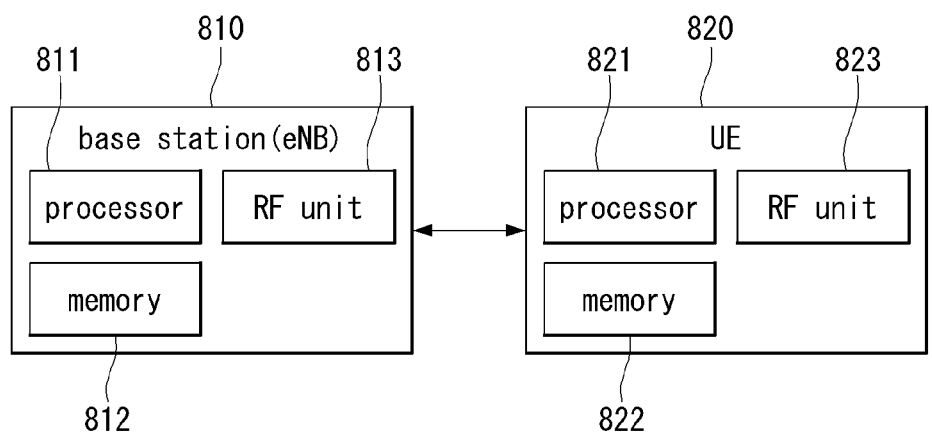
FIG. 8 is a block diagram illustrating a configuration of a wireless communication device to which methods proposed in the disclosure are applicable.

FIG. 8 is a block diagram illustrating a configuration of a wireless communication device according to an embodiment of the present disclosure.

Referring to FIG. 8, a wireless communication system includes a base station 810 and a plurality of UEs 820 positioned in the coverage of the base station 810.

The base station 810 includes a processor 811, a memory 812, and a radio frequency (RF) unit 813. The processor 811 implements the functions, processes or steps, and/or methods proposed above in connection with FIGS. 1 to 7.

Wireless interface protocol layers may be implemented by the processor 811.

The memory 812 is connected with the processor 811 to store various pieces of information for driving the processor 811.

The RF unit 813 is connected with the processor 811 to transmit and/or receive wireless signals.

The UE 820 includes a processor 821, a memory 822, and an RF unit 823.

The processor 821 implements the functions, processes or steps, and/or methods proposed above in connection with FIGS. 1 to 7.

Wireless interface protocol layers may be implemented by the processor 821.

The memory 822 is connected with the processor 821 to store various pieces of information for driving the processor 821.

The RF unit 823 is connected with the processor 821 to transmit and/or receive wireless signals.

The memory 812 and 822 may be positioned inside or outside the processor 811 and 821 and be connected with the processor 811 and 821 via various known means.

The base station 810 and/or the UE 820 may include a single or multiple antennas.

The above-described embodiments regard predetermined combinations of the components and features of the disclosure.

Each component or feature should be considered as optional unless explicitly mentioned otherwise.

Each component or feature may be practiced in such a manner as not to be combined with other components or features.

Further, some components and/or features may be combined together to configure an embodiment of the disclosure.

The order of the operations described in connection with the embodiments of the disclosure may be varied. Some components or features in an embodiment may be included in another embodiment or may be replaced with corresponding components or features of the other embodiment.

It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof.

When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations.

The software code may be stored in a memory and driven by a processor.

The memory may be positioned inside or outside the processor to exchange data with the processor by various known means.

It is apparent to one of ordinary skill in the art that the disclosure may be embodied in other specific forms without departing from the essential features of the disclosure.

Thus, the above description should be interpreted not as limiting in all aspects but as exemplary.

The scope of the present disclosure should be determined by reasonable interpretations of the appended claims and all equivalents of the present disclosure belong to the scope of the present disclosure.

INDUSTRIAL AVAILABILITY

Although the CSI reporting method in the wireless communication system according to the disclosure has been described in connection with examples in which it applies to 5G systems (new RAT systems), the scheme is also applicable to other various wireless communication systems.

The invention claimed is:

1. A method of reporting aperiodic channel state information (CSI) in a wireless communication system, the method performed by a user equipment (UE), the method comprising:

receiving, from a base station, configuration information for a plurality of reporting settings, wherein each of the plurality of reporting settings includes (i) at least one first channel measurement resource (CMR) and/or at least one first interference measurement resource (IMR) and (ii) a reporting parameter;

receiving, from the base station, control information representing a measurement resource related to the aperiodic CSI, wherein the measurement resource includes (i) at least one second CMR and/or (ii) at least one second IMR;

determining at least one specific reporting setting to be triggered, among the plurality of reporting settings, based on (i) the at least one second CMR and/or (ii) the at least one second IMR represented by the control information;

computing the aperiodic CSI related to each of the at least one specific reporting setting; and transmitting, to the base station, the aperiodic CSI related to each of the at least one specific reporting setting on a physical uplink control channel (PUCCH), wherein each reporting setting including any one of (i) the at least one second CMR and/or (ii) the at least one second IMR represented by the control information is determined as the at least one specific reporting setting, wherein each of the at least one specific reporting setting includes (i) at least one specific CMR and/or at least one specific IMR and (ii) the any one of the at least one second CMR and/or the at least one second IMR represented by the control information, wherein the aperiodic CSI related to each of the at least one specific reporting setting includes (i) a measurement on the at least one specific CMR and/or the at least one specific IMR and (ii) a measurement on the any one of the at least one second CMR and/or the at least one second IMR represented by the control information, and wherein the aperiodic CSI related to each of the at least one specific reporting setting is computed by updating only the measurement on the any one of the at least one second CMR and/or the at least one second IMR represented by the control information.

2. The method of claim 1, wherein the CMR is a CSI-RS resource, and wherein the IMR is a CSI-IM resource or an interference CSI (ICSI)-RS resource.

3. The method of claim 2, further comprising:

receiving, from the base station, downlink control information including information for a CSI request, wherein measurement resource included in the reporting setting indicated in the CSI request is received from the base station during a specific time.

4. The method of claim 3, wherein the specific time is a sum of a first time before receiving the CSI request and a second time after receiving the CSI request.

5. The method of claim 4, wherein information for the first time and information for the second time are received from the base station via radio resource control (RRC) signaling.

6. The method of claim 2, wherein the measurement resource is used for CSI acquisition.

7. The method of claim 1, further comprising:

receiving, from the base station, information on (i) a first time period and (ii) a second time period which are related to a time period for computing the aperiodic CSI via radio resource control (RRC) signaling, wherein based on that the at least one specific CMR and/or the at least one specific IMR included in each of the at least one specific reporting setting is measured during a time period from a time of receiving the control information before as much as the first time period, the aperiodic CSI related to each of the at least one specific reporting setting includes (i) the measurement which is measured during the time period on the at least one specific CMR and/or the measured at least one specific IMR and (ii) the measurement which is updated only for the any one of the at least one second CMR and/or the at least one second IMR represented by the control information.

8. The method of claim 7, wherein based on that the at least one specific CMR and/or the at least one specific IMR is not allocated before the time of receiving the control information, the aperiodic CSI related to each of the at least one specific reporting setting is computed based on that all CMR and/or IMR related to each of the at least one specific reporting setting is measured (i) after receiving the control information and (ii) within the second time period.

9. A user equipment (UE) configured to report aperiodic channel state information (CSI) in a wireless communication system, the UE comprising:
    a radio frequency (RF) module for transceiving a radio signal; and
    a processor functionally connected with the RF module, wherein the processor is configured to:
    receive, from a base station, configuration information for a plurality of reporting settings, wherein each of the plurality of reporting settings includes (i) at least one first channel measurement resource (CMR) and/or at least one first interference measurement resource (IMR) and (ii) a reporting parameter;
    receive, from the base station, control information representing a measurement resource related to the aperiodic CSI, wherein the measurement resource includes (i) at least one second CMR and/or (ii) at least one second IMR;
    determine at least one specific reporting setting to be triggered, among the plurality of reporting settings, based on (i) the at least one second CMR and/or (ii) the at least one second IMR represented by the control information;
    compute the aperiodic CSI related to each of the at least one specific reporting setting; and
    transmit, to the base station, the aperiodic CSI related to each of the at least one specific reporting setting on a physical uplink control channel (PUCCH),
    wherein each reporting setting including any one of (i) the at least one second CMR and/or (ii) the at least one second IMR represented by the control information is determined as the at least one specific reporting setting,
    wherein each of the at least one specific reporting setting includes (i) at least one specific CMR and/or at least one specific IMR and (ii) the any one of the at least one second CMR and/or the at least one second IMR represented by the control information,
    wherein the aperiodic CSI related to each of the at least one specific reporting setting includes (i) a measurement on the at least one specific CMR and/or the at least one specific IMR and (ii) a measurement on the any one of the at least one second CMR and/or the at least one second IMR represented by the control information, and
    wherein the aperiodic CSI related to each of the at least one specific reporting setting is computed by updating only the measurement on the any one of the at least one second CMR and/or the at least one second IMR represented by the control information.

10. The UE of claim 9, wherein the CMR is a CSI-RS resource, and
    wherein the IMR is a CSI-IM resource or an interference CSI (ICSI)-RS resource.

11. A method of receiving an aperiodic channel state information (CSI) report in a wireless communication system, the method performed by a base station, the method comprising:
    transmitting, to a user equipment (UE), configuration information for a plurality of reporting settings, wherein each of the plurality of reporting settings includes (i) at least one first channel measurement resource (CMR) and/or at least one first interference measurement resource (IMR) and (ii) a reporting parameter;
    transmitting, to the UE, control information representing a measurement resource related to the aperiodic CSI, wherein the measurement resource includes (i) at least one second CMR and/or (ii) at least one second IMR, and
    wherein at least one specific reporting setting to be triggered, among the plurality of reporting settings, is determined based on (i) the at least one second CMR and/or (ii) the at least one second IMR represented by the control information; and
    receiving, from the UE, the aperiodic CSI related to each of the at least one specific reporting setting on a physical uplink control channel (PUCCH),
    wherein each reporting setting including any one of (i) the at least one second CMR and/or (ii) the at least one second IMR represented by the control information is determined as the at least one specific reporting setting,
    wherein each of the at least one specific reporting setting includes (i) at least one specific CMR and/or at least one specific IMR and (ii) the any one of the at least one second CMR and/or the at least one second IMR represented by the control information,
    wherein the aperiodic CSI related to each of the at least one specific reporting setting includes (i) a measurement on the at least one specific CMR and/or the at least one specific IMR and (ii) a measurement on the any one of the at least one second CMR and/or the at least one second IMR represented by the control information, and
    wherein the aperiodic CSI related to each of the at least one specific reporting setting is computed by updating only the measurement on the any one of the at least one second CMR and/or the at least one second IMR represented by the control information.

* * * * *